J. L. GARVER.
RESILIENT WHEEL.
APPLICATION FILED MAY 26, 1919.
1,410,177.
Patented Mar. 21, 1922.
3 SHEETS—SHEET 2.
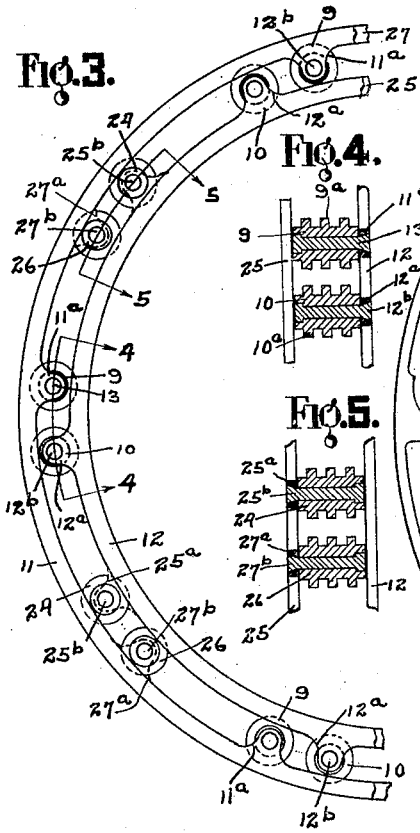
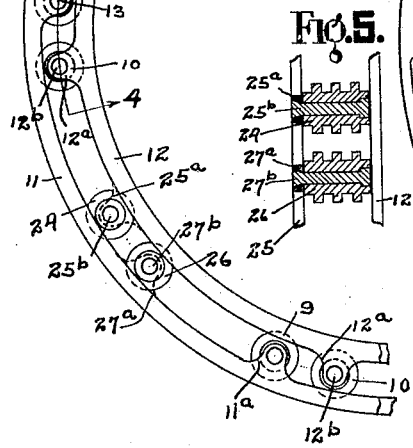
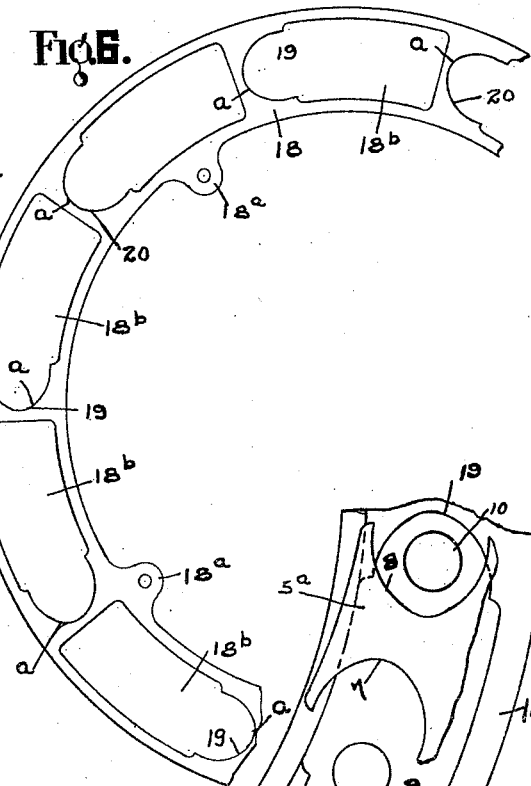
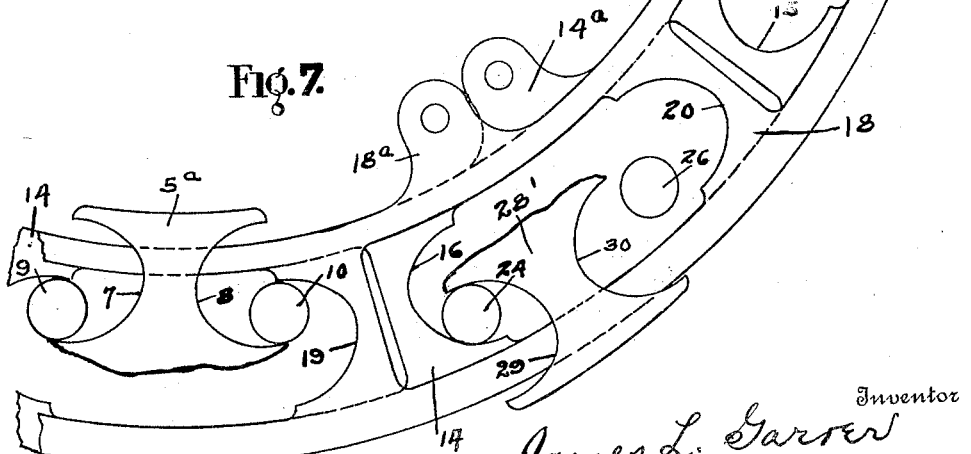
Inventor
James L. Garver
By Staley & Bowman
Attorneys
Witness
Chas. J. Welch

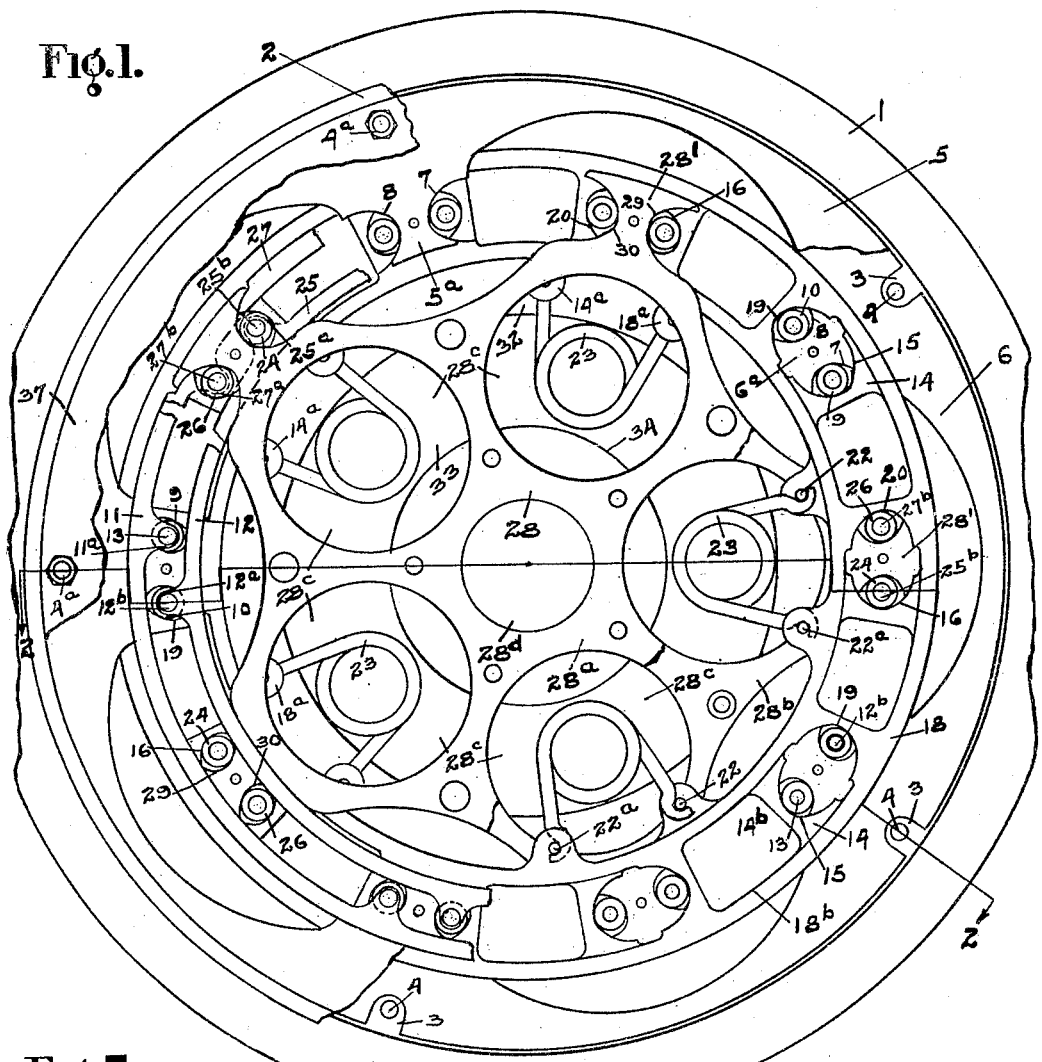
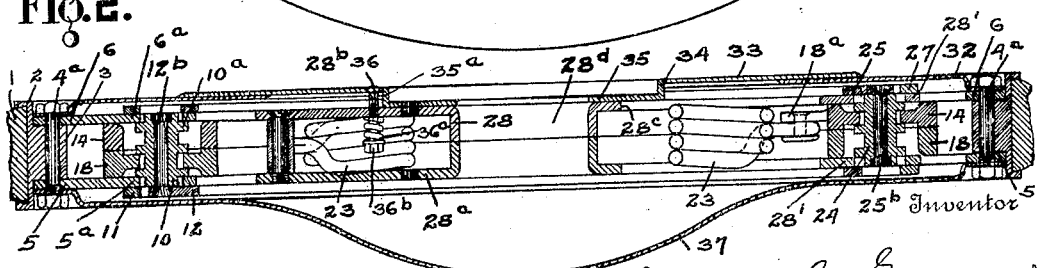

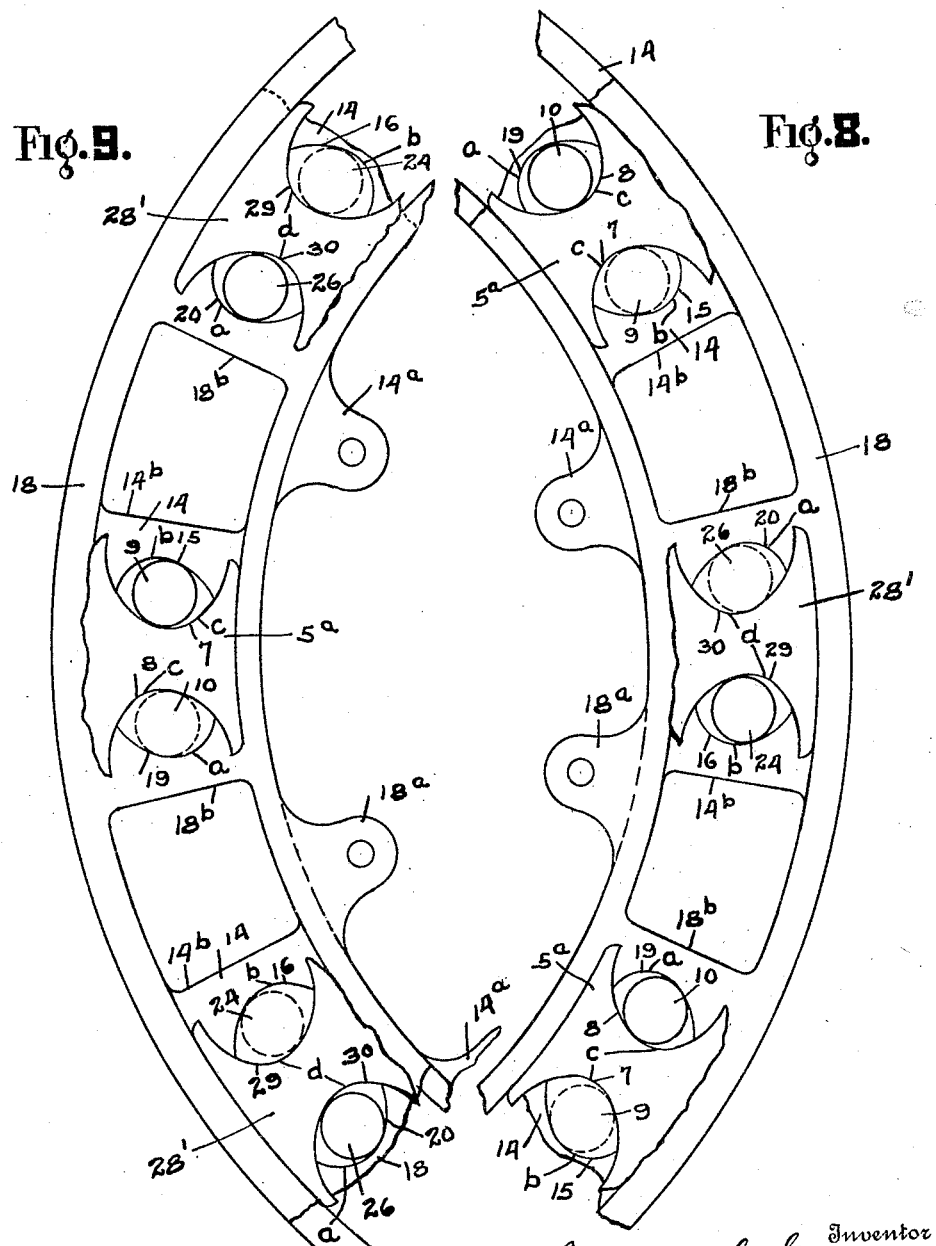

UNITED STATES PATENT OFFICE.

JAMES L. GARVER, OF SPRINGFIELD, OHIO.

RESILIENT WHEEL.

1,410,177.

Specification of Letters Patent.   Patented Mar. 21, 1922.

Application filed May 26, 1919. Serial No. 299,729.

*To all whom it may concern:*

Be it known that I, JAMES L. GARVER, a citizen of the United States, residing at Springfield, in the county of Clark and State of Ohio, have invented certain new and useful Improvements in Resilient Wheels, of which the following is a specification.

My invention relates to improvements in resilient wheels, and more particularly relates to a wheel of this character wherein the axle is carried yieldingly relative to the wheel rim by means of coupling rings which occupy a comparatively large circumference of the wheel and which have movable engagement with both the hub and rim members of the wheel, and which are impelled by resilient elements which operate, under the influence of load or shock, uniformly in all positions of the wheel, in opposite circumferential directions, to cause said hub and rim to be maintained normally in a substantially concentric position with respect to each other.

An object of this invention is to provide a wheel of the type referred to which is capable of being built with a central bore to conform to any standard hub and also which may be equipped with any standard tire ring by slight modifications thereof.

A further object of my invention is to provide a resilient wheel wherein the rotatable parts of the resilient devices permit a quick initial movement of the axle under shock, and in which the degree of rotary movement of the resilient elements from such cause is reduced to the minimum.

A further object of my invention is to provide a resilient wheel which embodies resilient elements of comparatively long structure, thus obtaining the resulting soft or easy resilience during the initial movement of the parts and then a stiffer resistance by subsequent accelerated movement of the parts which actuate the resilient elements.

A further object of my invention is to provide in a resilient wheel means for preventing clashing of the parts upon returning to concentric position by so constructing the parts that the co-operating bearings will come in contact with each other at points removed from the final concentric position.

A further object of my invention is to eliminate friction between the relatively movable parts of the wheel.

A further object of my invention is to provide in a resilient wheel an enclosing side therefor which is not subjected to lateral strains imparted to the wheel structure, and one which is held in resilient relation with its co-operating wheel part at all times so that it will not be liable to separate therefrom by any variation of alignment of the wheel members.

A further object of my invention is to provide a resilient wheel wherein the rotatable parts which are impelled in opposite circumferential directions are maintained normally on a common center by equally distributing the resilient elements on opposite sides thereof but which rotatable parts may permit the resilient element to yield to the influence of driving strain by displacement.

A further object of my invention is to provide intervening anti-friction devices for the respective bearing faces of the wheel structure which are movable in a direction corresponding to the movement of the axle, and also have intervening coupling rings which are movable radially relatively to the inner and outer wheel members to only half the extent of the relative movement of the inner and outer members, both of which, contribute to reduction of the width of the various arc bearings.

In the accompanying drawings:—

Fig. 1 is a front elevation of a wheel embodying my improvements, the cover plate being broken away to expose the interior parts of the wheel, some of which parts are broken away to show the rear parts, with the tire ring also partly broken away.

Fig. 2 is a transverse section on the line 2—2 of Fig. 1.

Fig. 3 is a side view of portions of the roller carrying rings.

Fig. 4 is a section on the line 4—4 of Fig. 3.

Fig. 5 is a section on the line 5—5 of Fig. 3.

Fig. 6 is a side view of a portion of one of the coupling rings.

Fig. 7 is an enlarged detailed side view of some of the parts illustrating said parts in the position assumed when the wheel parts have moved to their extreme limit under load or shock.

Fig. 8 is an enlarged detail view of the bearing parts on the right-hand side of the wheel illustrating the means of preventing clashing of the parts in returning to concentric position.

Fig. 9 is a similar view of similar parts on the left-hand side of the wheel.

Referring to the drawings, 1 is a tire of any suitable kind, preferably solid rubber, 2 is a channel ring within which the rubber tire is built, which ring is provided on its inner periphery with a series of integrally arranged ears 3 each having an aperture 4. Bolted to these ears by bolts $4^a$ are outer and inner flange members 5 and 6, the flange 5 being secured to the front side of the ears and flanges 6 to the rear side thereof; the flanges 5 and 6 forming in effect a part of the outer wheel rim. Each of these flanges is provided with a series of equally spaced inwardly extending projections $5^a$ and $6^a$, the projections of the respective flanges being in oppositely arranged pairs. Formed on one side of each of these flanges is a bearing 7, and on the opposite side of each flange projection is a similar bearing 8. Five of these projections are provided on each flange in the present case.

Arranged on the forward side of the front flange 5 and its bearing-projection $5^a$ is an exterior ring 11 and an interior ring 12. The inner periphery of the exterior ring 11 is provided with a series of equally-spaced ears $11^a$, five in number in the present case, each of which has a rearwardly projecting pin 13 upon which is rotatably mounted an anti-friction roller 9. The outer periphery of the interior ring 12 also has a series of equally spaced ears $12^a$, five in number each of which has a similar rearwardly projecting pin $12^b$ upon which is rotatably mounted an anti-friction roller 10, the arrangement being such that the respective rolls 9 and 10 are arranged on a common circumferential line, which line also passes through the center of the bearing 7 and 8.

Located between the flanges 5 and 6 is a front coupling ring 18 and a rear coupling ring 14. The rear coupling ring 14 is provided with a series of ten slots $14^a$ at one end of each of which is a bearing face, these bearing faces being designated alternately as 15 and 16. The bearings 15 are arranged so as to be opposed to the rim bearings 7, with the anti-friction rollers 9 intervening. The front coupling ring 18 is likewise provided with a series of ten slots $18^b$, at one end of which is a bearing face, the bearing faces being designated alternately as 19 and 20. The bearings 19 are opposed to the bearings 8 on the rim projections, with the anti-friction rollers 10 intervening.

The rear coupling ring 14 is provided with a series of ears $14^a$ on its inner periphery, carrying pins 22, while the coupling ring 18 is provided with a series of similar ears $18^a$ carrying similar pins $22^a$, which pins 22 and $22^a$ act as rests or supports for the respective ends of a resilient element, in the present case shown as a torsion spring 23. The springs 23 tend to impell the coupling rings 14 and 18 in opposite circumferential directions into engagement with the rim bearing 7 and 18 respectively through the medium of the interposed anti-friction rolls 9 and 10.

Arranged on the rear side of the inner rim flange and its projections $6^a$ is an interior ring 25 and exterior ring 27 constructed in all respects like the outer rings 11 and 12.

The inner periphery of the exterior ring 27 is provided with a series of equally spaced ears $27^a$, five in number, each of which has a forwardly projecting pin $27^b$ which has rotatably mounted thereon an anti-friction roller 26. The outer periphery of the interior ring 25 has a series of five ears $25^a$, each ear carrying a forwardly extending pin $25^b$ upon which is rotatably mounted an anti-friction roller 24; the rollers 24 co-operating with the bearing 16 of the coupling ring 14 and the rollers 26 co-operating with the bearings 20 of the coupling ring 18.

A central wheel member 28 has peripheral flanges $28^a$ and $28^b$ having a series of circular cut away portions $28^c$ to afford clearance for the springs 23; the wheel member being provided with a central bore $28^d$ to receive a standard hub (not shown).

Each flange $28^a$ and $28^b$ has a series of projections $28'$ arranged opposite each other. Each projection being provided with two bearing faces 29 and 30, facing in opposite directions. The faces 29 on both flanges engage the rollers 24 of the inner interior ring 25, while the bearings 30 on said flanges engage the rollers 26 of the inner exterior ring 27. The bearings 29 and 30 of this inner wheel member are preferably positioned in the same plane of the wheel and also in the same circumference as are the bearings 7 and 8 of the outer rim member.

Each of the anti-friction rollers 9 and 10 is provided with a series of three peripheral flanges $9^a$ and $10^a$ (see Fig. 4 for detail). The bearing projections $5^a$ and $6^a$ of the outer rim member and the bearing projections $28'$ of the inner rim member embracing the two outer flanges, while the bearing portions of the respective coupling rings 14 and 18 extend into the spaces between the respective roller flanges. This arrangement maintains all the parts in their proper vertical plane.

In order to eliminate dirt and to retain lubricant, the rear side of the wheel is enclosed by relatively slidable plates 32 and 33, the plate 32 being fixed to the outer wheel rim by any suitable means and the plate 33 being carried by the central wheel member by any suitable means which will permit it to move laterally relatively to said central member; the plate 33 being provided with a bore 34 slidably fitted about an outturned flange 35ª on a plate 35 which is secured to the inner wheel member. The plate 33 has studs 36 which project through apertures in the flange 28ᵇ with nuts 36ᵇ on their inner ends and springs 36ª interposed between the nuts and the flange 28ᵇ. Therefore, if the outer and inner wheel members should be forced slightly out of vertical alignment, there is no undue strain on the light enclosing plate nor does an opening occur between the plates for the admission of dirt. The front of the wheel is enclosed by a covering 37 of any suitable shape to permit it to clear the axle or hub end.

The operation of the devices described is as follows:— When the central wheel member is borne downwardly by load or shock, the rear coupling ring 14, whose bearing faces 15 and 16 are facing upwardly at the right of the wheel center, is forced downwardly by the bearing faces 29 on the inner wheel member, acting upon the bearing faces 16, through the medium of the rollers 24, and the bearing faces 15 of said coupling ring move away from their corresponding co-operating bearing faces 7 on the outer wheel member. At the left of the wheel center, the bearing faces 15 and 16 on the coupling ring 14 face downwardly and are thus upheld by the bearing faces 7 on the outer rim member by bearing 15. Thus coupling ring 14 is caused to rotate or swing slightly about its center of support at the left. The coupling ring 18, whose bearing faces 19 and 20 are facing upwardly at the left of the center of the wheel, is borne downwardly by the bearing faces 30 of the inner wheel member acting upon the bearing faces 20 through the rollers 26. The bearing faces 19 and 20 of the coupling ring 18, facing downwardly at the right of the center of the wheel, are in like manner upheld by the bearing faces 8 of the outer wheel member and thus by a like action this ring 18 is caused to rotate or swing but in a direction opposite to the rotation of the ring 14. This rotation of the rings 14 and 18 in opposite directions relative to each other results in compressing all of the resilient elements 23.

In the earlier movement of the inner wheel member from concentric position, the engagement of co-operating bearing points is at or near opposite horizontal points with respect to the wheel center, but in the latter movement, the points of engagement move upwardly and downwardly until at the final limit of movement the bearing points are at or near the vertical center line of the wheel, as shown in Fig. 7, in which it will be seen that the bearing faces 7 and 8 of one of the rim projections 5ª are sustaining the coupling rings 14 and 18 through the medium of the anti-friction rollers 9 and 10, the bearing faces 16 and 20 on the coupling rings 14 and 18 in turn sustaining the inner wheel member through the medium of the anti-friction rollers 24 and 26, which are in contact with the bearing faces 29 and 30 of the said inner wheel members. This is clearly shown in Fig. 7 with respect to the bearings 16 and 29 the bearing 20 which supports the bearing 30, however, being not shown in this figure as it is located on the opposite side of the central vertical line of the wheel. It will be observed that the bearings 8 and 19 on a substantially horizontal line through the center of the wheel which were in engagement at the beginning of the movement are now open or out of engagement in this Fig. 7. At this point, it will be seen that the rollers such as 9, 10 and 24 have moved to the vertices of the minor axes of the elliptical-shaped bearing faces. By reason of the elliptical form of the bearing faces, the rollers 9 and 10 at the bottom of the wheel have been forced to move circumferentially of the wheel by the bearing faces 7 and 8 a greater distance than would have resulted if the bearing faces were formed on a true circle; the extent of this added movement being represented by the eccentricity of the ellipses forming the bearing face. In like manner the coupling rings are required to move circumferentially to a greater extent relative to the rollers 9 and 10 by the bearing faces 15 and 19 as shown in Fig. 7 by the position of the bearing 19 and roller 10. Thus the bearing faces 15 and 19, and consequently the coupling rings 14 and 18, have been required to move relatively to each other a distance greater by four times the distance represented by the eccentricity of each bearing face. The beginning of this accelerated movement by the coupling rings is dependent upon the length of the radius of the circles forming the vertex of the major axis of the bearing face of each bearing and also of the length of its arc. If the radius and arc were short, making the vertex narrow, then the acceleration would begin earlier, and if long, making a wide vertex the beginning would be later. Thus, by a modification of the contour of the bearings, different results in spring action may be obtained.

To prevent clashing of the parts in returning to normal position after a displacement thereof by shock, means are provided for causing the anti-friction rollers to first make contact with their respective bearings at points to one side of the vertex of the major axis of each elliptical-shaped bearing so that the rollers will roll along the arc of the bearing toward the major axis apex instead of coming directly into contact with the bearing at that apex, which would result in a clash. To this end means are provided for permitting the rollers, under load or shock, to assume a position out of line with the major axis apex, or, in other words, a position between the apexes of the minor and major axes of the bearing, as follows: It will be understood that in the normal concentric position of the parts, all of the anti-friction rollers occupy a substantially central position in their respective bearings, or positions at the exact vertices of the major axes of the elliptical bearings, in which position the resistance of the springs is greater than the load. So soon as the load is increased relative to the spring resistance, each of the load bearing rollers has a tendency to be rolled on the bearing faces by the pressure of the inner wheel bearing thereon and by reason of recesses or depressions $a$, $b$, $c$ and $d$ formed in the respective bearing faces, a rolling movement of the roller actually takes place, causing the rollers to move side-wise of the wheel, carrying the coupling rings with them to a side-wise position, thus bringing the rolls out of line with their normal seats on each bearing to the same degree so that when the parts approach their normal concentric positions again, the weight bearing rollers, will ride up the incline of the recesses, while those rollers which have not been in weight bearing position, will contact with their opposed bearing arcs at points higher than the normal concentric points of contact and then move down those arcs with a rolling action.

In the coupling ring 18, the depressions are represented by $a$, the depressions in the bearing 20 being on the outer side of the vertex on the major axis, and the depressions in the bearing 19 being on the inside of the said vertex, so that they alternate. In the coupling ring 14, the depressions are represented by $b$, the depressions in the bearing 15 being on the outside and those in the bearings 16 on the inside. In the outer rim member, the depressions are represented by $c$, the depressions in the bearing 7 being on the inside of the vertex and those in the bearing 8 on the outside thereof. In the inner wheel member the depressions are represented by $d$, the depressions in the bearing 29 being on the outer side of the major axis vertex and the ones in the bearing 30 on the inside thereof. This results in the depressions of any two opposing bearings being arranged on opposite sides of the vertices of the major axes of said bearings, and also results in the weight carrying bearings of both the inner and outer members on both sides of the wheels being depressed in the same direction from the vertices of the major axis thereof, in this case to the right thereof, as shown at bearings 7 and 30 in Fig. 9 and at bearings 8 and 29 in Fig. 8.

Referring to Figs. 8 and 9, we will suppose a shock which moves the bearings 29 on the right and 30 on the left vertically downward on their respective rollers 24 and 26. In this movement, bearing 30 on the right opens from its co-operating bearing 20 and bearing 29 on the left opens from its co-operating bearing 16. This permits the rollers 24 on the right and 26 on the left to roll to the right into the depressions $d$ of bearing 29 on the right and depression $d$ of bearing 30 on the left. It is apparent that the rollers in moving to the right carry the rings 14 and 18, with them to the right their bearings (16 on the right and 20 on the left) seeking the depressions $a$ on the left and thus shifting these rings to one side of their normal positions or to one side of the vertical direction.

This movement is further encouraged on the left wheel side by a like co-operation of the outer wheel bearing 7 and the coupling ring bearing 15, roller 9 intervening, the roller 9 seeking depression $c$ of bearing 7 and the depression $b$ of bearing 15 on the left, and on the right by bearings 8 of the outer wheel and the coupling ring bearing 19, roller 10 intervening, seeking the depressions $c$ of bearing 8 and $a$ of bearing 19; the bearing 19 on the left opening from bearing 8 and the bearing 15 on the right opening from bearing 7.

It is apparent then, that on return, as the wheel parts approach concentric position the open bearings 8 and 19 on the left and bearings 7 and 15 on the right approach each other in this eccentric relation, so that the rolls 10 and 9 respectively will contact the bearings at points higher thereon than the vertices thereof, and then, only to the extent that the spring tension exceeds the load, will there be a tendency to move the rings again to their normal concentric position by rolling the rollers 10 and 9 downwardly of the arcs of their respective bearings and thereby lifting the load bearing rollers, 9, on the left and 10 on the right out of the depression up an incline towards the position. The same result obviously occurs between co-operating bearings of the rings and inner wheel member. These rings are again shifted to concentric position as the spring force causes the rollers which intervene the bearing which have been open in their relations, to roll downwardly of the respective bearings approaching the concentric position by rolling instead of by direct contact, and being retarded in this movement by the time element of shifting the rings again into their normal concentric position and also retarded by the tendency of the weight of load to retain the rings in their eccentric position.

By the construction described, it will be seen that if the weight is greater on one side of the center of the wheel than on the other, such as that caused by driving stress, then the coupling ring bearing the load on that side of the vertical wheel center will move downwardly against the resilient elements to a greater extent than the other coupling ring, proportionately to the greater weight, thus cushioning the drive.

It will also be seen that I have provided a wheel wherein the rotatable parts included in the resilient devices bear the load at points near the circumference thereof and which therefore respond more readily to the impulse of shock in starting them in rotation, and whereby the degree of their rotation relative to the movement of the axle is reduced due to the fact that the fulcrum for each of the rotatable parts—the coupling rings—is located at a point as widely separated from the weight or load thereon as environments will permit.

It will be further seen that a resilient wheel structure is provided which may be installed upon any standard hub and which may also be equipped with any standard tire with no further change than in the tire ring itself.

By the construction and arrangement of the resilient elements I am enabled to employ springs of comparatively long structure which results in a soft or easy resilience upon the initial movement of the parts with an increased resistance by subsequent movement of the parts, the resistance of the springs during the latter movement being utilized more rapidly due to the accelerated movement of the rotating parts which the springs intervene caused by the peculiar form of the bearing faces as explained.

Further, by the peculiar formation of the bearing faces, it will be seen that clashing of the parts in arriving at normal position is eliminated, and that by the employment of the intervening anti-friction rollers between the bearing faces, friction is reduced to the minimum.

By the construction of that part of the casing enclosing the rear of the wheel structure, lateral strains upon the structure are prevented from being transmitted thereto.

It will further be noted that by the arrangement of coupling rings and movable intervening anti-friction rollers for the bearings, the width of the bearing faces may be materially reduced, resulting in less opening of adjacent bearing faces, thus causing a more even or smoother action of the parts when the wheel is rolling with the parts in eccentric position and permitting the use of a lesser number of like bearings in a given circumference.

Having thus described my invention, I claim:—

1. In a resilient wheel, a rim member, a hub member, resilient devices to yieldingly hold said members in normal relative position comprising coupling rings intervening said members and resilient elements to oppose the rotation of said coupling rings in opposite directions, said coupling rings having radial movement in relation to both of said members.

2. In a resilient wheel, a rim member provided with a plurality of bearings, some of which bearings face in one circumferential direction and the balance of the bearings in the other circumferential direction, a hub member also provided with a plurality of bearings some of which likewise face in one circumferential direction and the others in the opposite circumferential direction, a rotatable member provided with bearings facing in one circumferential direction which co-operate with certain of said bearings on said rim and hub members, another rotatable member provided with a plurality of bearings facing in the opposite circumferential direction to those of the first mentioned rotatable member which co-operate with other bearings on said rim and hub members, and resilient means tending to maintain said co-operating bearings in engagement.

3. In a resilient wheel, a rim member, a hub member, resilient devices to yieldingly hold said members in normal relative position comprising rotatable coupling rings intervening said members and resilient elements to oppose the rotation of said rings in opposite directions, and anti-friction devices arranged between said rings and one or both of said members.

4. In a resilient wheel, a rim member, a hub member, resilient devices to normally position said member in substantially concentric position, said resilient devices including bearings which cooperate with said rim and hub members, anti-friction members intervening said bearings, and means independent of said bearings for maintaining a plurality of anti-friction members in fixed spaced relation with each other.

5. In a resilient wheel, a rim member, a hub member, resilient devices to normally position said member in substantially concentric relation, said resilient device including bearings which cooperate with like bearings on said rim or hub member by circumferential engagement, anti-friction members intervening said cooperating bearings, and interengaging parts between said anti-friction member and bearings to maintain them in their normal vertical positions.

6. In a resilient wheel, a rim member, a hub member, each of said members having a plurality of bearings facing circumferentially of said wheel, and resilient members to yieldingly support said hub member, said resilient member also including bearings for engagement with the bearings of said hub and rim members, the contour of the bearings of one or more of said members being semi-elliptical, the major axis thereof lying circumferentially of said wheel.

7. In a resilient wheel, a rim member, a hub member, and resilient devices to yieldingly position said members in their normal relative positions, comprising rotatable members in operative engagement with said rim and hub members, said resilient devices impelling said rotatable members in opposite circumferential directions and maintaining them normally on a common center but permitting them to become eccentric when a greater weight is imposed on one wheel side than the other.

8. In a resilient wheel, a hub member, a rim member, oppositely rotatable parts between said members, resilient elements between said parts, and means acting under load or shock to accelerate said rotatable parts against said resilient elements at a less speed at the beginning of the relative movement of said hub and rim members than at a later movement thereof.

9. In a resilient wheel, a hub member, a rim member, rotatable parts between said members, resilient elements between said parts, and means acting under load or shock to accelerate said rotatable parts against said resilient elements at a greater speed during the later relative movement of the hub and rim members than at their preceding movement.

10. In a resilient wheel, a hub member, a rim member, and resilient devices interposed between said members including bearing faces, said bearing faces being so formed as to act under load or shock to shift the resilient devices to one side of their otherwise normal positions during the initial departure of the axle from wheel center.

11. In a resilient wheel, a hub member, a rim member, resilient devices for connecting said hub and rim members comprising rotatable members which are impelled in opposite circumferential directions by resilient means, a plurality of bearings carried by one or more of said members, said bearings being substantially semi-elliptical in contour, the major axis thereof extending circumferentially of the wheel.

12. In a resilient wheel, a hub member, a rim member, one or both of said members being provided with bearings facing in both circumferential direction, resilient devices to yieldingly maintain said members in their normal relative positions, said devices comprising rotatable parts which are impelled in opposite-circumferential directions by resilient means and are provided with bearings to co-operate with the bearings of at least one of said members, anti-friction members between cooperating bearings, and the contour of at least a part of said bearings being such as to cause said anti-friction members to be shifted to right or left of their normal position on said bearing faces under load or shock.

13. In a resilient wheel, a hub member, a rim member and resilient devices interposed between said members to yieldingly maintain therein their normal relative positions, said devices and one or both of said members being connected by a bearing of elliptical contour, a roller positioned normally at the apex of the major axis of said elliptical bearing, the construction and arrangement being such as to cause said roller to be shifted to one side of said major axis under load or shock.

14. In a resilient wheel, a rim member, a hub member, oppositely rotatable parts which act as levers, one end of one lever fulcruming on one side of said rim member and one end of the other lever fulcruming on the other side of said rim member, said hub member being supported by said levers at opposite sides of the wheel center, and resilient means to support the yieldable ends of said levers.

15. In a resilient wheel, a rim member, a bearing fixed in relation thereto for engagement circumferentially of said wheel, a central member also provided with a bearing for engagement circumferentially of said wheel, resilient means to yieldingly maintain said members in their normal relative positions, said means including a rotatable part provided with a bearing for co-operation with the bearing of said rim member and another bearing for co-operation with the bearing of said central member, and a resilient element to tend to maintain said bearings in engagement.

16. In a resilient wheel, a tire ring, bearings fixed in relation thereto for engagement circumferentially of said wheel, a hub member provided with bearings also for engagement circumferentially of said wheel, resilient means including oppositely rotatable parts which are provided with bearings for co-operation with each of the bearings of said members, and a resilient element to tend to maintain said bearings in engagement.

17. In a resilient wheel, a rim member, a hub member, and resilient devices with alternate bearings for engaging with said members, the arrangement and construction being such that the relative radial movement of said members is divided between the points of alternate engagement of said devices with said members.

18. In a resilient wheel, an outer wheel member, an inner hub member, said members being relatively movable, a casing part concentric with said hub member and having a resilient laterally slidable connection therewith, said casing part overlapping the sides of said wheel member and yieldably held thereto, and additional means for causing said members to rotate uniformly.

19. In a resilient wheel, a rim member, a hub member, said members being relatively movable, and overlapping enclosing parts, one of said parts being fixed to the rim member and the other of said parts being resiliently and slidably connected to the hub member so as to yield with the other part under relatively lateral movement of said members, and additional means for causing said members to rotate uniformly.

20. In a resilient wheel, a hub member, a rim member, devices for yieldingly supporting said hub member which include oppositely rotatable coupling rings which have relative movement with said hub and rim members both radially and circumferentially by engagement through a bearing whose contour is elliptical, and resilient elements operatively associated with said oppositely rotatable parts.

21. In a resilient wheel, a rim member, a hub member, resilient devices to yieldingly hold said members in normal relative position comprising rotatable coupling rings intervening said members and resilient elements to oppose the rotation of said rings in opposite directions, anti-friction devices arranged between said rings and one or both of said members, and means independent of said bearings for maintaining a plurality of anti-friction members in fixed spaced relation with each other.

In testimony whereof, I have hereunto set my hand this 22nd day of May, 1919.

JAMES L. GARVER.

Witness:
CHAS. I. WELCH.